US010011761B2

(12) United States Patent
Alwattari

(10) Patent No.: US 10,011,761 B2
(45) Date of Patent: Jul. 3, 2018

(54) POLYMERIC SURFACTANT CONTAINING A PROTEIN HEAD GROUP AND LIPID TAIL GROUP

(71) Applicant: Halliburton Energy Services, Inc., Houston, TX (US)

(72) Inventor: Ali Alwattari, Kingwood, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 15/304,469

(22) PCT Filed: May 30, 2014

(86) PCT No.: PCT/US2014/040386
§ 371 (c)(1),
(2) Date: Oct. 14, 2016

(87) PCT Pub. No.: WO2015/183320
PCT Pub. Date: Dec. 3, 2015

(65) Prior Publication Data
US 2017/0037301 A1 Feb. 9, 2017

(51) Int. Cl.
| | |
|---|---|
| *C09K 8/60* | (2006.01) |
| *C09K 8/035* | (2006.01) |
| *C09K 8/04* | (2006.01) |
| *C09K 8/40* | (2006.01) |
| *C09K 8/42* | (2006.01) |
| *C09K 8/52* | (2006.01) |
| *C09K 8/54* | (2006.01) |
| *C09K 8/64* | (2006.01) |
| *E21B 21/00* | (2006.01) |
| *E21B 33/13* | (2006.01) |
| *E21B 37/00* | (2006.01) |
| *E21B 41/02* | (2006.01) |
| *E21B 43/26* | (2006.01) |

(52) U.S. Cl.
CPC ............. *C09K 8/604* (2013.01); *C09K 8/035* (2013.01); *C09K 8/04* (2013.01); *C09K 8/40* (2013.01); *C09K 8/42* (2013.01); *C09K 8/52* (2013.01); *C09K 8/54* (2013.01); *C09K 8/64* (2013.01); *C09K 2208/32* (2013.01); *E21B 21/00* (2013.01); *E21B 33/13* (2013.01); *E21B 37/00* (2013.01); *E21B 41/02* (2013.01); *E21B 43/26* (2013.01)

(58) Field of Classification Search
CPC .......... C09K 8/604; C09K 8/035; C09K 8/04; C09K 8/40; C09K 8/52; C09K 8/54; C09K 8/64; C09K 3208/32
See application file for complete search history.

(56) References Cited

U.S. PATENT DOCUMENTS

| | | | | |
|---|---|---|---|---|
| 8,193,127 | B2* | 6/2012 | Thieme | C09K 8/602 166/308.1 |
| 8,772,205 | B2* | 7/2014 | Bismarck | C04B 28/02 166/305.1 |
| 2004/0216875 | A1 | 11/2004 | Todd et al. | |
| 2005/0107503 | A1* | 5/2005 | Couillet | C09K 8/62 524/249 |
| 2006/0254774 | A1 | 11/2006 | Saini et al. | |
| 2006/0258544 | A1* | 11/2006 | Saini | C09K 8/035 507/219 |
| 2009/0075846 | A1 | 3/2009 | Qu et al. | |
| 2009/0288825 | A1 | 11/2009 | Tang | |

OTHER PUBLICATIONS

International Search Report and Written Opinion dated Feb. 26, 2015; International PCT Application No. PCT/US2014/040386.
Banat, I.M., "Biosurfactants Production and Possible Uses in Microbial Enhanced Oil Recovery and Oil Pollution Remediation: A Review", Bioresource Technology, 1995, vol. 51, pp. 1-12.
Serrano, Alicia G. et al., "Protein-Lipid Interactions and Surface Activity in the Pulmonary Surfactant System", Chemistry and Physics of Lipids, 2006, vol. 141, pp. 105-118.
Teglia, A., and G. Secchi. "New protein ingredients for skin detergency: Native wheat protein—surfactant complexes." International journal of cosmetic science 16.6 (1994): 235-246.
Penfold, J., et al. "Nature of Amine—Surfactant Interactions at the Air—Solution Interface†." Langmuir 25.7 (2008): 3972-3980.
Ding, Junqi, et al. "Effects of lung surfactant proteins, SP-B and SP-C, and palmitic acid on monolayer stability." Biophysical Journal 80.5 (2001): 2262-2272.
Cooper, Alan, and Malcolm W. Kennedy. "Biofoams and natural protein surfactants." Biophysical chemistry 151.3 (2010):96-104.

\* cited by examiner

*Primary Examiner* — Silvana C Runyan
(74) *Attorney, Agent, or Firm* — McGuire Woods LLP

(57) ABSTRACT

A treatment fluid comprising: a base fluid; and a surfactant, wherein the surfactant: (i) is a polymer; and (ii) comprises a hydrophilic head group and a hydrophobic tail group, wherein the hydrophilic head group comprises a protein, and wherein the hydrophobic tail group comprises a lipid. A method of treating a subterranean formation comprising: introducing the treatment fluid into a well, wherein the well penetrates the subterranean formation.

21 Claims, No Drawings

POLYMERIC SURFACTANT CONTAINING A PROTEIN HEAD GROUP AND LIPID TAIL GROUP

TECHNICAL FIELD

A variety of treatment fluids are used in the Oil and Gas industry. For example, fracturing fluids are used in stimulation treatments of subterranean formations. A surfactant can be used to help the fluid penetrate into the formation. A surfactant can also be used to convert solids of the formation from a water-wet state to an oil-wet state.

DETAILED DESCRIPTION

As used herein, the words "comprise," "have," "include," and all grammatical variations thereof are each intended to have an open, non-limiting meaning that does not exclude additional elements or steps.

As used herein, a "fluid" is a substance having a continuous phase that can flow and conform to the outline of its container when the substance is tested at a temperature of 71° F. (22° C.) and a pressure of one atmosphere "atm" (0.1 megapascals "MPa"). A fluid can be a liquid or gas. A homogenous fluid has only one phase; whereas a heterogeneous fluid has more than one distinct phase. A colloid is an example of a heterogeneous fluid. A heterogeneous fluid can be: a slurry, which includes a continuous liquid phase and undissolved solid particles as the dispersed phase; an emulsion, which includes a continuous liquid phase and at least one dispersed phase of immiscible liquid droplets; a foam, which includes a continuous liquid phase and a gas as the dispersed phase; or a mist, which includes a continuous gas phase and liquid droplets as the dispersed phase. Any of the phases of a heterogeneous fluid can contain dissolved materials and/or undissolved solids. As used herein, a "base fluid" is a liquid that is in the greatest concentration and is the solvent of a solution or the continuous phase of a heterogeneous fluid.

Oil and gas hydrocarbons are naturally occurring in some subterranean formations. In the oil and gas industry, a subterranean formation containing oil or gas is referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from the wellbore is called a reservoir fluid.

A well can include, without limitation, an oil, gas, or water production well, or an injection well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered the region within approximately 100 feet radially of the wellbore. As used herein, "into a well" means and includes into any portion of the well, including into the wellbore or into the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

During wellbore operations, it is common to introduce a treatment fluid into the well. Examples of common treatment fluids include, but are not limited to, drilling fluids, spacer fluids, completion fluids, work-over fluids, and stimulation fluids. As used herein, a "treatment fluid" is a fluid designed and prepared to resolve a specific condition of a well or subterranean formation, such as for stimulation, isolation, gravel packing, or control of gas or water coning. The term "treatment fluid" refers to the specific composition of the fluid as it is being introduced into a well. The word "treatment" in the term "treatment fluid" does not necessarily imply any particular action by the fluid.

Hydraulic fracturing, sometimes simply referred to as "fracturing" or "fracing," is a common stimulation treatment. A treatment fluid adapted for this purpose is sometimes referred to as a fracturing fluid or "frac fluid." The fracturing fluid is pumped at a sufficiently high flow rate and high pressure into the wellbore and into the subterranean formation to create a fracture in the subterranean formation. As used herein, "creating a fracture" means making a new fracture in the formation or enlarging a pre-existing fracture in the formation. The fracturing fluid may be pumped down into the wellbore at high rates and pressures, for example, at a flow rate in excess of 100 barrels per minute (3,150 U.S. gallons per minute) at a pressure in excess of 5,000 pounds per square inch ("psi") (35 megapascals "MPa").

A surfactant can be used in a variety of treatment fluids, such as frac fluids. A surfactant is an amphiphilic molecule comprising a hydrophobic tail group and a hydrophilic head group. The hydrophilic head can be charged. A cationic surfactant includes a positively-charged head. An anionic surfactant includes a negatively-charged head. A zwitterionic surfactant includes both a positively- and negatively-charged head. A surfactant with no charge is called a non-ionic surfactant.

A surfactant can lower the interfacial tension between two liquids or between a solid and a liquid. As such, a surfactant can be used to reduce the surface tension between the solids of a subterranean formation and the treatment fluid in order for the treatment fluid to penetrate farther into the formation. A surfactant can also be used to change the wettability of the surface of solids of a formation. Wettability means the preference of a surface to be in contact with one liquid or gas rather than another. Accordingly, "oil-wet" means the preference of a surface to be in contact with an oil phase rather than a water phase or gas phase, and "water-wet" means the preference of a surface to be in contact with a water phase rather than an oil phase or gas phase. A surfactant can be used to change the wettability of the surface of the solids from being water-wet to being oil-wet. This change can help promote production of oil and/or gas from a reservoir.

If a surfactant is in a sufficient concentration in a solution, then the surfactant molecules can form micelles. A "micelle" is an aggregate of surfactant molecules dispersed in a solution. A surfactant in an aqueous solution can form micelles with the hydrophilic heads in contact with the surrounding aqueous solvent, sequestering the hydrophobic tails in the micelle center. The surfactant must be in a sufficient concentration to form micelles, known as the critical micelle concentration. The critical micelle concentration is the concentration of surfactant above which micelles are spontaneously formed.

There is an ongoing need for improved surfactants that provide enhanced performance. There is also a need for additives, such as surfactants, that are environmentally friendly, biocompatible, and biodegradable. It has been discovered that a polymer surfactant containing a protein hydrophilic head group and a lipid hydrophobic tail group can be used as an additive in a treatment fluid. The surfactant is more environmentally friendly and can have a higher biocompatibility and biodegradability compared to other surfactants. Other advantages of the new surfactant are that there is lower foaming and less sudsing that occurs during use compared to other surfactants.

A polymer is a large molecule composed of repeating units, typically connected by covalent chemical bonds. A polymer is formed from monomers. During the formation of the polymer, some chemical groups can be lost from each monomer. The piece of the monomer that is incorporated into the polymer is known as the repeating unit or monomer residue. The backbone of the polymer is the continuous link between the monomer residues. The polymer can also contain functional groups connected to the backbone at various locations along the backbone. Polymer nomenclature is generally based upon the type of monomer residues comprising the polymer. A polymer formed from one type of monomer residue is called a homopolymer. A copolymer is formed from two or more different types of monomer residues. The number of repeating units of a polymer is referred to as the chain length of the polymer. The number of repeating units of a polymer can range from approximately 11 to greater than 10,000. In a copolymer, the repeating units from each of the monomer residues can be arranged in various manners along the polymer chain. For example, the repeating units can be random, alternating, periodic, or block. The conditions of the polymerization reaction can be adjusted to help control the average number of repeating units (the average chain length) of the polymer.

A polymer has an average molecular weight, which is directly related to the average chain length of the polymer. The average molecular weight of a polymer has an impact on some of the physical characteristics of a polymer, for example, its solubility and its dispersibility. For a copolymer, each of the monomers will be repeated a certain number of times (number of repeating units). The average molecular weight ($M_w$) for a copolymer can be expressed as follows:

$$M_w = \Sigma w_x M_x$$

where $w_x$ is the weight fraction of molecules whose weight is $M_x$.

As used herein, "biocompatible" means the quality of not having toxic or injurious effects on biological systems. For example, if the treatment fluid is used in off-shore drilling, then a release of the surfactant into the water would not be harmful to aquatic life.

The OSPAR (Oslo/Paris convention for the Protection of the Marine Environment of the North-East Atlantic) Commission has developed a pre-screening scheme for evaluating chemicals used in off-shore drilling. According to OSPAR, a chemical used in off-shore drilling should be substituted with an environmentally-friendly chemical if any of the following are met: a. it is on the OSPAR LCPA (List of Chemicals for Priority Action); b. it is on the OSPAR LSPC (List of Substances of Possible Concern); c. it is on Annex XIV or XVII to REACH (Regulation (EC) No 1907/2006 of the European Parliament and of the Council of 18 Dec. 2006 concerning the Registration, Evaluation, Authorisation and Restriction of Chemicals); d. it is considered by the authority, to which the application has been made, to be of equivalent concern for the marine environment as the substances covered by the previous sub-paragraphs; e. it is inorganic and has a $LC_{50}$ or $EC_{50}$ less than 1 mg/l; f. it has an ultimate biodegradation (mineralization) of less than 20% in OECD 306, Marine BODIS or any other accepted marine protocols or less than 20% in 28 days in freshwater (OECD 301 and 310); g. half-life values derived from simulation tests submitted under REACH (EC 1907/2006) are greater than 60 and 180 days in marine water and sediment respectively (e.g. OECD 308, 309 conducted with marine water and sediment as appropriate); or h. it meets two of the following three criteria: (i) biodegradation: less than 60% in 28 days (OECD 306 or any other OSPAR-accepted marine protocol), or in the absence of valid results for such tests: less than 60% (OECD 301B, 301C, 301D, 301F, Freshwater BODIS); or less than 70% (OECD 301A, 301E); (ii) bioaccumulation: BCF>100 or log $P_{ow} \geq 3$ and molecular weight <700, or if the conclusion of a weight of evidence judgement under Appendix 3 of OSPAR Agreement 2008-5 is negative; or (iii) toxicity: $LC_{50}$<10 mg/l or $EC_{50}$<10 mg/l; if toxicity values <10 mg/l are derived from limit tests to fish, actual fish $LC_{50}$ data should be submitted. As used herein, a polymer is considered to be "environmentally friendly" if any of the above conditions are not satisfied.

According to an embodiment, a treatment fluid comprises: a base fluid; and a surfactant, wherein the surfactant: (i) is a polymer; and (ii) comprises a hydrophilic head group and a hydrophobic tail group, wherein the hydrophilic head group comprises a protein, and wherein the hydrophobic tail group comprises a lipid.

According to another embodiment, a method of treating a portion of a subterranean formation comprises: introducing the treatment fluid into a well, wherein the well penetrates the subterranean formation.

The discussion of preferred embodiments regarding the treatment fluid or any ingredient in the treatment fluid, is intended to apply to the composition embodiments and the method embodiments. Any reference to the unit "gallons" means U.S. gallons.

The treatment fluid can be a heterogeneous fluid. The treatment fluid can be a slurry, emulsion, or invert emulsion. The treatment fluid includes a base fluid. The base fluid can be water. The water can be selected from the group consisting of freshwater, brackish water, saltwater, and any combination thereof. The base fluid can further include a water-soluble salt. Preferably, the salt is selected from the group consisting of sodium chloride, calcium chloride, calcium bromide, potassium chloride, potassium bromide, magnesium chloride, sodium bromide, cesium formate, cesium acetate, and any combination thereof.

The base fluid can also be a hydrocarbon liquid. The hydrocarbon liquid can be selected from the group consisting of: a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof. Crude oil can be separated into fractional distillates based on the boiling point of the fractions in the crude oil. An example of a suitable fractional distillate of crude oil is diesel oil. A commercially-available example of a fatty acid ester is PETROFREE® ESTER base fluid, marketed by Halliburton Energy Services, Inc. The saturated hydrocarbon can be an alkane or paraffin. Preferably, the saturated hydrocarbon is an alkane. The paraffin can be an isoalkane (isoparaffin), a linear alkane (paraffin), or a cyclic alkane (cycloparaffin). Example of suitable alkanes include SARALINE® 185V synthetic base fluid, a mixture of alkanes with carbon chain lengths predominately of C10 to C20, available from Shell MDS in Malaysia and BAROID ALKANE™ base fluid, marketed by Halliburton Energy Services, Inc. Examples of suitable paraffins include, but are not limited to: BIO-BASE 360® an isoalkane and n-alkane; BIO-BASE 300™ a linear alkane; BIO-BASE 560® a blend containing greater than 90% linear alkanes; and ESCAID 110™ a mineral oil blend of mainly alkanes and cyclic alkanes. The BIO-BASE liquids are available from Shrieve Chemical Products, Inc. in The Woodlands, Tex. The ESCAID liquid is available from ExxonMobil in Houston, Tex. The unsaturated hydrocarbon can be an alkene, alkyne, or aromatic. The alkene can be an isoalkene, linear alkene, or cyclic alkene. The linear alkene can be a linear alpha olefin or an internal olefin. An example of a linear alpha olefin is NOVATEC™, available from M-I SWACO in Houston, Tex. Examples of internal olefins include ENCORE® drilling fluid and ACCOLADE® drilling fluid, marketed by Halliburton Energy Services, Inc.

The treatment fluid also includes the surfactant. The surfactant is a polymer. The polymer can be a copolymer. The copolymer can be arranged as alternating, periodic, random, or block. The polymer can have a molecular weight greater than about 100. The polymer can also have a molecular weight in the range of about 100 to about 1,000,000, preferably about 100 to about 100,000, more preferably about 100 to about 10,000. The polymer can also have a molecular weight such that the surfactant is soluble or dispersible in the base fluid. As used herein, the term "soluble" means that at least one part of the substance dissolves in 10,000 parts of a liquid.

The surfactant comprises a hydrophilic head group and a hydrophobic tail group. The hydrophilic head group comprises a protein. The protein can be naturally occurring. A protein is a polyamide consisting of one or more long chains of amino acid residues. Examples of suitable proteins include, but are not limited to, glucose, casein, soybean, albumin, collagen, keratin and/or amino acids synthetically connected together as polymers i.e., poly amino acid surfactants "PABS." PABS, for example, can be the chemical condensation reaction of a fatty acid with hydrolyzed proteins. Commercial-available examples of suitable PABS include CROTEIN™, marketed by Croda; LEXEIN® X-300, marketed by Inolex Chemical Company; and SOL-UTEIN™, marketed by American Protein Corp.

The hydrophobic tail group comprise a lipid. The lipid can be a fatty acid or derivative thereof, such as monoglycerides, diglycerides, triglycerides (including fats and oils), waxes, and phospholipids. The lipid can be synthetic or naturally based. Examples of a synthetic lipid are polybutene, 1,2-dioleoyl-sn-glycero-3-phospho-rac-(1-glycerol); 1,2-dioleoyl-sn-glycero-3-phospho ethanolamine; 1,2-dimyristoyl-sn-glycero-3-phospho-rac-(1-glycerol); 1,2-dieicosapentaenoyl-sn-glycero-3-phosphocholine; 1,2-dipalmitoyl-sn-glycero-3-phospho-rac-(1-glycerol); and 1,2-distearoyl-sn-glycero-3-phospho-L-serine. Examples of naturally-based lipids include Aloe Vera oil, apricot kernel oil, avocado oil, babassu oil, black currant seed oil, borage oil, camelina oil, canola oil, carrot oil, castor oil, chia seed oil, coconut oil, corn oil, cottonseed oil, flax seed oil (linseed), grape seed oil, jojoba oil, lanolin, lard, olive oil, omega 3 fatty acids, poly alpha olefins, peanut oil, rice bran oil, pumpkin seed oil, and sunflower oil.

The surfactant can be naturally occurring or a modified naturally-occurring product. Examples of suitable surfactants include, but are not limited to, native wheat protein-surfactant complexes, glycolipids, phospholipids, emulsan (produced by *Acinetobacter calcoaceticus*), sophorolipids (produced by the yeasts *Candida albicans* and *Starmerella clade*), rhamnolipid (produced by *Pseudomonas aeruginosa*), ranaspumins (found from tropical frog foam nests), ranasmurfin (found from a different frog), latherin (a spreading agent from horse sweat), surfactant protein-C, and modified versions of any of the foregoing.

The surfactant can be environmentally friendly. Due to the natural origin of at least the protein hydrophilic head group, the surfactant can also be biocompatible and/or biodegradable.

The surfactant can be in at least a sufficient concentration such that the surfactant spontaneously forms micelles or reverse micelles (i.e., the critical micelle concentration). According to an embodiment, the surfactant is in a concentration such that the treatment fluid becomes a gel. In an embodiment, the surfactant is in a concentration in the range of about 0.0001% to about 40% by weight of the base fluid.

The treatment fluid can be a spot treatment fluid that is introduced into the well as a pill between one or more different types of other treatment fluids. For example, the treatment fluid can be introduced as a pill between two or more applications of a fracturing fluid. The treatment fluid can also be, without limitation, a drilling fluid, spacer fluid, cement composition, workover fluid, fracturing fluid, a cleaning and/or maintenance fluid, or a corrosion inhibitor fluid.

The treatment fluid can further include other additives. The other additives can be selected based on the type of treatment fluid. For example, if the treatment fluid is a frac fluid, then the fluid can also include proppant, a viscosifier, etc. Other additives can include cement, proppant, a viscosifier, a suspending agent, a weighting agent, a friction reducer, a filler, a fluid loss additive, a set retarder, a strength-retrogression additive, a light-weight additive, a defoaming agent, a mechanical property enhancing additive, a lost-circulation material, a filtration-control additive, a thixotropic additive, and combinations thereof.

The treatment fluid can also include one or more co-surfactants or additional surfactants. A co-surfactant can aid the surfactant in obtaining properties, such as changing the solids of a subterranean formation from water-wet to oil-wet. An additional surfactant can be used to provide additional properties that the surfactant may not possess. An example of a co-surfactant is sodium lauryl sulfate (SLS).

The methods include introducing the treatment fluid into a well, wherein the well penetrates the subterranean formation. The well can be an oil, gas, or water production well, a geothermal well, or an injection well. The well can include a wellbore. The subterranean formation can be part of a reservoir or adjacent to a reservoir. The step of introducing the treatment fluid can be for the purpose of creating fractures within the subterranean formation. The treatment fluid can be in a pumpable state before and during introduction into the well. The treatment fluid can be mixed prior to introduction. The step of mixing can include using a mixing apparatus. The treatment fluid can also be introduced into the well using a pump.

The methods can further include creating one or more fractures within the subterranean formation with the treatment fluid. The methods can further include placing proppant into the fractures. The proppant can remain in the fractures and form a proppant pack. The methods can also include introducing a consolidation fluid into the well. The consolidation fluid, for example a curable resin consolidation system, can consolidate the proppant of the proppant pack. The methods can also include producing a reservoir fluid from the subterranean formation after the step of introducing.

The exemplary fluids and additives disclosed herein may directly or indirectly affect one or more components or pieces of equipment associated with the preparation, delivery, recapture, recycling, reuse, and/or disposal of the disclosed fluids and additives. For example, the disclosed fluids and additives may directly or indirectly affect one or more mixers, related mixing equipment, mud pits, storage facilities or units, fluid separators, heat exchangers, sensors, gauges, pumps, compressors, and the like used generate, store, monitor, regulate, and/or recondition the exemplary fluids and additives. The disclosed fluids and additives may also directly or indirectly affect any transport or delivery equipment used to convey the fluids and additives to a well site or downhole such as, for example, any transport vessels, conduits, pipelines, trucks, tubulars, and/or pipes used to fluidically move the fluids and additives from one location to another, any pumps, compressors, or motors (e.g., topside or downhole) used to drive the fluids and additives into motion, any valves or related joints used to regulate the pressure or flow rate of the fluids, and any sensors (i.e., pressure and temperature), gauges, and/or combinations thereof, and the like. The disclosed fluids and additives may also directly or indirectly affect the various downhole equipment and tools that may come into contact with the fluids and additives such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of treating a subterranean formation comprising: introducing a treatment fluid into a well, wherein the well penetrates the subterranean formation, and wherein the treatment fluid comprises:
   a base fluid; and
   a surfactant, wherein the surfactant:
   (i) is a polymer;
   (ii) comprises a hydrophilic head group and a hydrophobic tail group, wherein the hydrophilic head group comprises a protein, and wherein the hydrophobic tail group comprises a lipid; and
   (iii) is selected from the group consisting of ranaspumins, ranasmurfin, latherin, surfactant protein-C, modified versions thereof, and any combination thereof.

2. The method according to claim 1, wherein the base fluid is water, and wherein the water is selected from the group consisting of freshwater, brackish water, saltwater, and any combination thereof.

3. The method according to claim 2, wherein the base fluid further comprises a water-soluble salt, wherein the salt is selected from the group consisting of sodium chloride, calcium chloride, calcium bromide, potassium chloride, potassium bromide, magnesium chloride, sodium bromide, cesium formate, cesium acetate, and any combination thereof.

4. The method according to claim 1, wherein the base fluid is a hydrocarbon liquid.

5. The method according to claim 4, wherein the hydrocarbon liquid is selected from the group consisting of: a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof.

6. The method according to claim 1, wherein the polymer is a copolymer.

7. The method according to claim 1, wherein the polymer has a molecular weight in the range of about 100 to about 100,000.

8. The method according to claim 1, wherein the polymer has a molecular weight such that the surfactant is soluble in the base fluid.

9. The method according to claim 1, wherein the protein is naturally occurring.

10. The method according to claim 1, wherein the protein is selected from glucose, casein, soybean, albumin, collagen, keratin, and amino acids synthetically connected together as polymers.

11. The method according to claim 1, wherein the lipid is a fatty acid or derivative thereof.

12. The method according to claim 11, wherein the lipid is selected from the group consisting of monoglycerides, diglycerides, triglycerides including fats and oils, waxes, phospholipids, and any combinations thereof.

13. The method according to claim 1, wherein the surfactant is biocompatible.

14. The method according to claim 1, wherein the surfactant is biodegradable.

15. The method according to claim 1, wherein the surfactant is in at least a sufficient concentration such that the surfactant spontaneously forms micelles or reverse micelles.

16. The method according to claim 1, wherein the treatment fluid is a drilling fluid, spacer fluid, cement composition, workover fluid, fracturing fluid, a cleaning and/or maintenance fluid, or a corrosion inhibitor fluid.

17. The method according to claim 1, wherein the treatment fluid further comprises other additives, wherein the other additives are selected from the group consisting of cement, proppant, a viscosifier, a suspending agent, a weighting agent, a friction reducer, a filler, a fluid loss additive, a set retarder, a strength-retrogression additive, a light-weight additive, a defoaming agent, a mechanical property enhancing additive, a lost-circulation material, a filtration-control additive, a thixotropic additive, and combinations thereof.

18. The method according to claim 1, wherein the treatment fluid further comprises one or more co-surfactants or additional surfactants.

19. The method according to claim 1, further comprising mixing the treatment fluid using a mixing apparatus.

20. The method according to claim 1, wherein the step of introducing comprises pumping the treatment fluid into the well using one or more pumps.

21. The method according to claim 1, wherein the surfactant is environmentally friendly.

* * * * *